(12) United States Patent
Vu

(10) Patent No.: US 6,990,162 B2
(45) Date of Patent: Jan. 24, 2006

(54) SCALABLE CLOCK DISTRIBUTION FOR MULTIPLE CRU ON THE SAME CHIP

(75) Inventor: Chuong D. Vu, Simi Valley, CA (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 745 days.

(21) Appl. No.: 10/041,888

(22) Filed: Jan. 7, 2002

(65) Prior Publication Data

US 2003/0128785 A1 Jul. 10, 2003

(51) Int. Cl.
*H04L 7/02* (2006.01)

(52) U.S. Cl. ...................................... 375/357; 375/359
(58) Field of Classification Search ................ 375/357, 375/359
See application file for complete search history.

(56) References Cited

U.S. PATENT DOCUMENTS

| 5,757,857 A | 5/1998 | Buchwald |
| 6,122,336 A | 9/2000 | Anderson |
| 6,144,675 A | 11/2000 | Wakabayashi et al. |
| 6,178,213 B1 | 1/2001 | McCormack et al. |
| 6,219,396 B1 | 4/2001 | Owada |
| 6,249,557 B1 | 6/2001 | Takatori et al. |
| 6,307,906 B1 | 10/2001 | Tanji et al. |
| 6,762,967 B2 * | 7/2004 | Tanizaki et al. ............ 365/201 |
| 2002/0067787 A1 * | 6/2002 | Naven et al. ................ 375/359 |

FOREIGN PATENT DOCUMENTS

WO WO 01/71966 A1 9/2001

* cited by examiner

*Primary Examiner*—Stephen Chin
*Assistant Examiner*—Jaison Joseph
(74) *Attorney, Agent, or Firm*—Christie, Parker & Hale LLP

(57) ABSTRACT

A scalable clock recovery system. In one embodiment the system comprises a clock master unit, a clock distribution network, and a plurality of clock recovery units. The master clock unit generates a plurality of master clock signals, which are received by the clock recovery units. The clock recovery units use multiple stages of mixing to generate a recovered clock. The recovered clock can be used to recover data from a serial data stream.

13 Claims, 5 Drawing Sheets

SCALABLE CLOCK DISTRIBUTION FOR MULTIPLE CRU ON THE SAME CHIP

BACKGROUND OF THE INVENTION

This invention relates generally to digital data communications systems, and more particularly to the recovery of clock and data signals from serial digital data streams.

In many communications systems, digital data is often transmitted without a clock signal that would otherwise indicate the sequence of data bits. This increases available bandwidth over a transmission medium through avoidance of transmission of an attendant clock signal. A non-return to zero (NRZ) data format is an example of a transmission scheme that does not require that a clock be transmitted along with the data.

The data signals, in the form of bits, are transmitted approximate a predetermined transmission rate. The transmission rate is determined by a clock in a data transmitter. Initially, it might seem possible to simply equip a data receiver with a clock operating at the same frequency as the clock in the data transmitter. Thus, data would automatically be received at the same rate that it was transmitted. However, even very small variations in the frequency of either of the two clocks would likely render this scheme unusable. A number of factors can lead to clock frequency variation, such as the age of the clocks and associated components, manufacturing tolerances, and environmental conditions such as temperature. In addition, if the clocks differ in phase by any substantial amount, data sampling could occur during data transitions, with resulting errors.

Since the data signals are transmitted approximate a predetermined rate, it is possible to extract timing information from the data stream itself. Using the data signal to extract timing information can be accomplished using phase locked loop approaches. The extracted timing information is used to recover the sequence of the bits in an incoming serial data transmission.

As demand for high speed communications continues to grow, multiple data streams are often used to transmit information. In order to simultaneously recover the information contained in each data stream, the timing information needs to be extracted from each data stream. This generally requires multiple phase locked loops, as at least one is ordinarily used for each data stream with the phased locked loops including clock generators such as oscillators, phase detectors, filters, etc. For communication systems having multiple data streams received by a single chip, the number of such elements that can be effectively placed on a single chip is constrained by area constraints, the package technology used, and by the thermal requirements of the system.

BRIEF SUMMARY OF THE INVENTION

The present invention provides for a scalable clock recovery system able to be implemented on a single chip. In one embodiment the invention comprises a clock master unit (CMU), a plurality of clock recovery units (CRU), and a clock distribution network. The CMU generates master clock signals, providing them to the clock distribution network. In one embodiment the master clock signals comprise a truth clock signal and a quadrature clock signal. The CRUs receive the master clock signals from the clock distribution network. The CRUs use the master clock signals to generate a recovered clock signal. In one embodiment, multiple levels of mixing are used to generate the recovered clock signal. The recovered clock signal can be used to recover data from an incoming serial data stream.

A further embodiment of the present invention comprises a clock generation system. The clock generation system includes means for generating multiple out of phase clock signals. The clock signals are approximate a predetermined frequency. An embodiment of the invention also comprises means for producing a recovered clock signal. The means for producing a recovered clock signal uses at least two clock signals generated by the means for generating multiple out-of-phase clock signals. The recovered clock signal has a selectively variable phase and a frequency approximate the frequency of the multiple out-of-phase clock signals.

These and other aspects of the present invention will be more fully appreciated in view of the attached figures briefly described and in the following detailed description.

DETAILED DESCRIPTION

Figure 1:
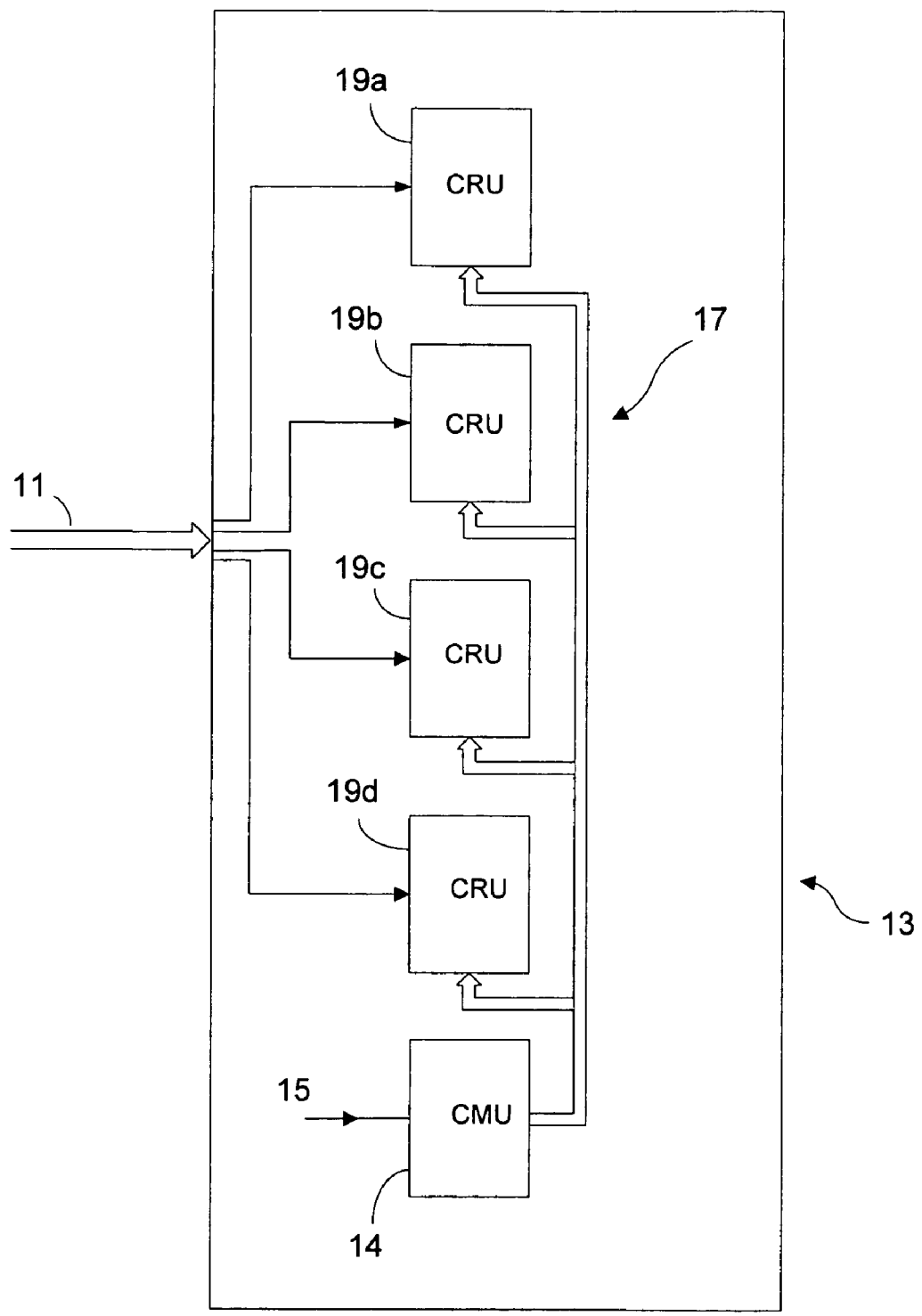
FIG. 1 is a top-level block diagram of an implementation incorporating multiple CRUs on a single chip in accordance with the present invention.

A top-level block diagram of an embodiment of the present invention can be seen in FIG. 1. In FIG. 1, multiple data streams 11 are received from a transmission medium (not shown) by a chip 13. A clock master unit (CMU) 14 located on the chip receives a reference clock signal 15 from a voltage controlled oscillator (VCO) (not shown). The reference clock signal is approximate an expected transmission frequency of the serial data signals provided by the multiple data streams.

The CMU uses the reference clock signal to form master clock signals. The CMU provides the master clock signals to a clock distribution network 17. The clock distribution network couples the CMU to a plurality of clock recovery units (CRUs) 19a–d that are on the same chip as the CMU. Each of the CRUs uses the master clock signals and the incoming serial data stream to construct a regenerated clock signal. The regenerated clock signals are used to recover data from the incoming serial data stream.

Figure 2:
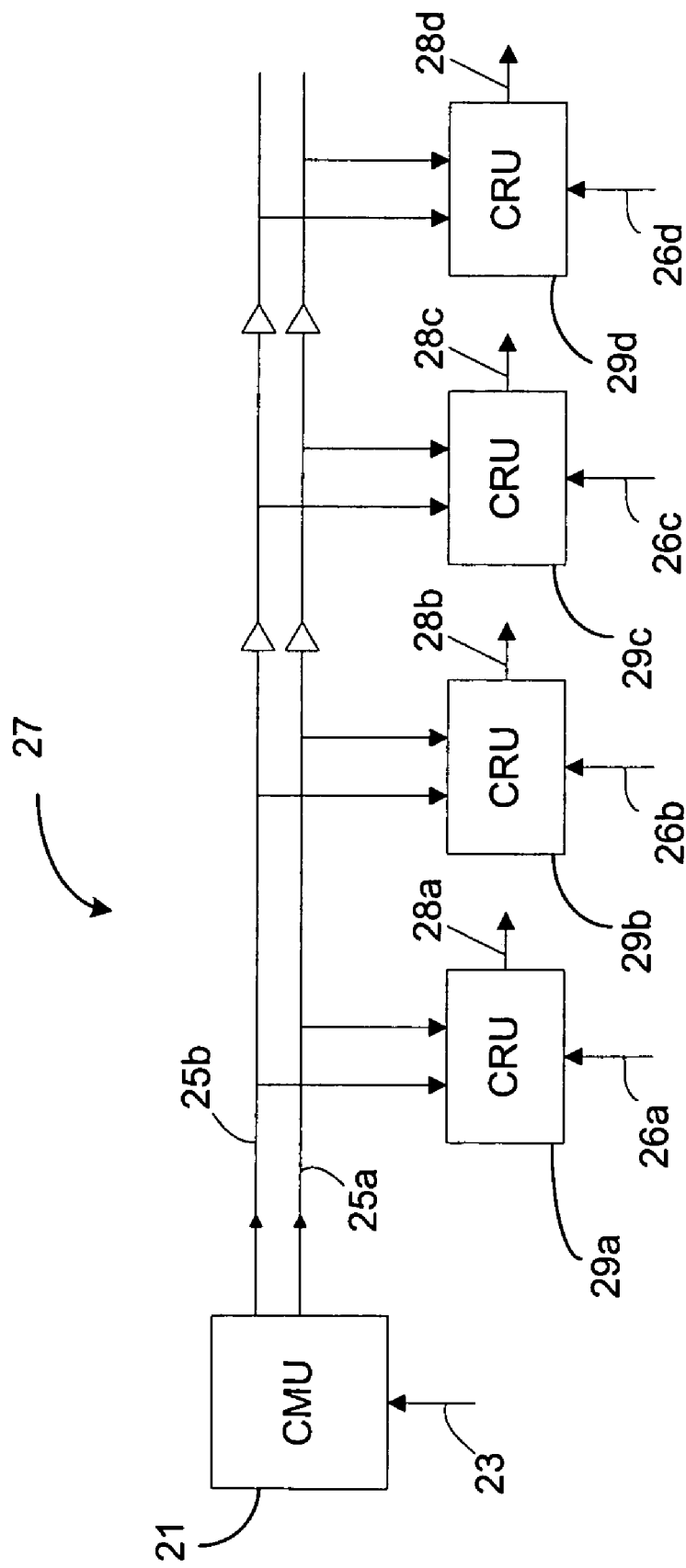
FIG. 2 illustrates a block diagram of an embodiment in accordance with aspects of the present invention having a clock master unit distributing two clock signals to multiple CRUs on the same chip.

As can be seen from FIG. 2, a CMU 21 receives a reference clock signal 23 from a VCO (not shown). The CMU generates two master clock signals 25a,b from the reference clock signal. In a preferred embodiment, the two master clock signals are a truth clock signal and a quadrature clock signal. The truth clock signal and the quadrature clock signal are at the same frequency, but have a constant phase difference of 90 degrees.

Figure 5:
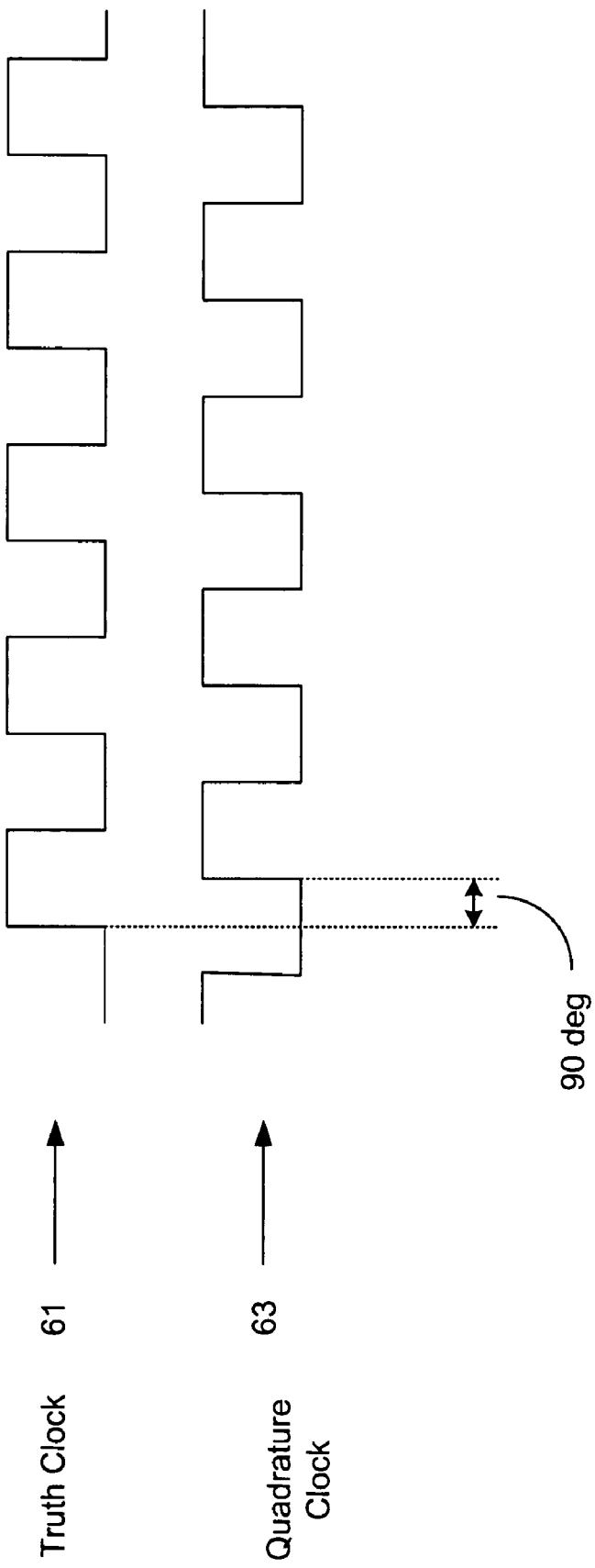
FIG. 5 is a timing diagram of truth and quadrature clocks generated by the CMU of FIG. 1.

FIG. 5 is a timing diagram of a truth clock signal 61 and a quadrature clock signal 63. As illustrated, the truth clock leads the quadrature clock by 90 degrees. It is also possible for the truth clock to lag the quadrature clock by 90 degrees. In other embodiments other, even non-constant, phase differences are used.

Returning now to FIG. 2, both the truth clock signal and the quadrature clock signal are provided to a clock distribution network 27. The clock distribution network provides the master clock signals to multiple CRUs 29a–d on the chip. The phase relationship between the master clock signals is maintained over the clock distribution network. In order to maintain the phase difference between the master clock signals, the clock distribution network uses equal length or very nearly equal length transmission lines for each clock signal, and high speed clock buffers to maintain signal strength. Other clock distribution techniques well known in the art are also employed to help maintain a constant phase difference between the truth and quadrature clocks. Each CRU receives both the truth clock signal and the quadrature clock signal in addition to a serial data stream 26a–d. The recovered clock 28a–d is used to recover data from an incoming serial data stream.

Figure 3:
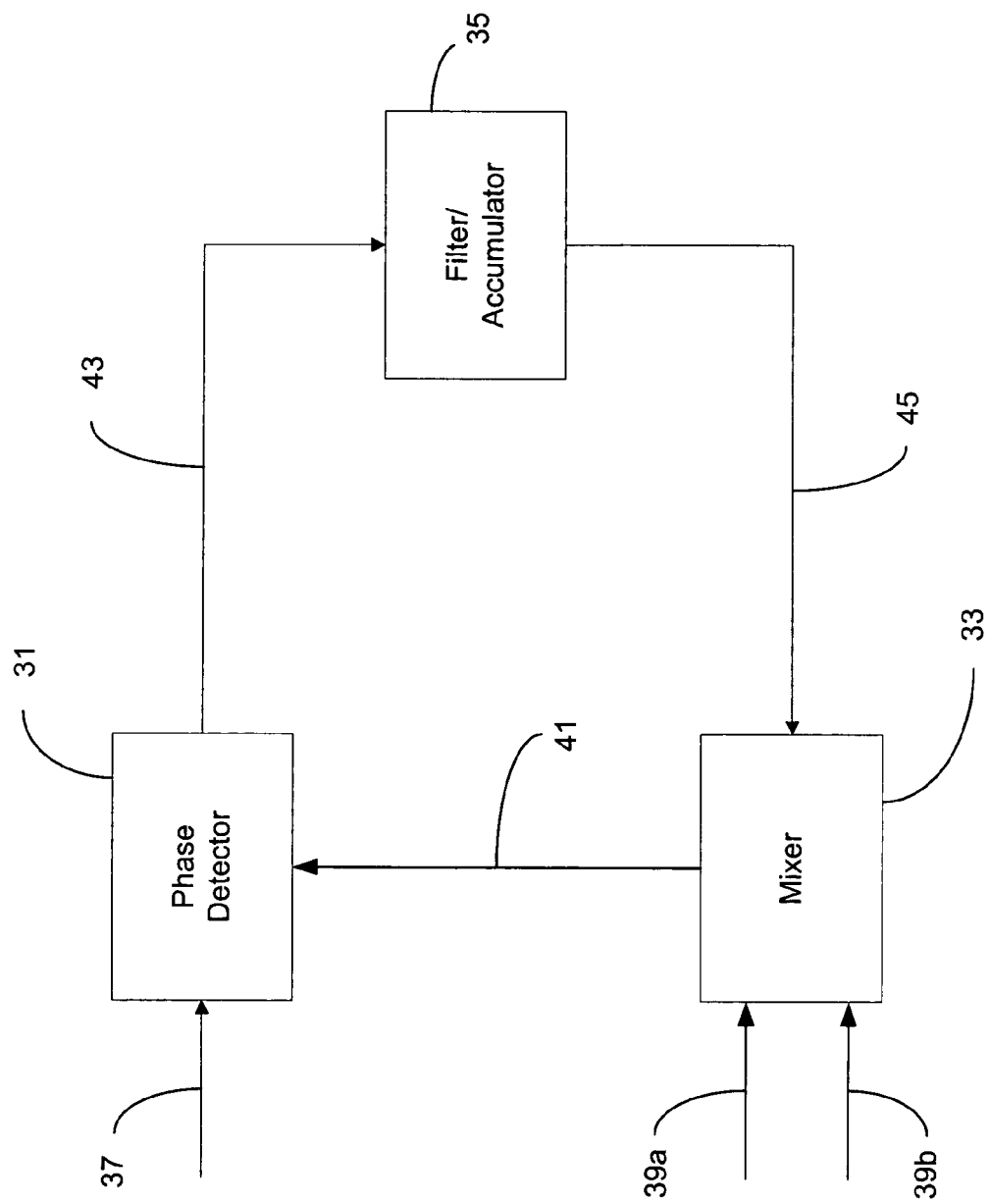
FIG. 3 illustrates a block diagram of an embodiment of a CRU used in the the system of FIG. 2.

As can be seen from FIG. 3, each CRU 30 includes a phase detector 31, a mixer 33 and a filter/accumulator 35. Also as can be seen, each CRU additionally receives an incoming serial data signal 37 and the master clock signals 39a,b. The mixer receives the master clock signals, the output from the filter/accumulator and produces the recovered clock. The phase detector receives the serial data signal and the recovered clock and provides phase data to the filter/accumulator.

The phase detector receives both the incoming serial data signal and the recovered clock signal generated by the mixer. The phase detector compares the relative phases of the recovered clock and the incoming serial data signal. The phase detector outputs a signal 43 containing the phase difference information to the filter/accumulator. The filter/accumulator uses the phase difference information to instruct the mixer to adjust the phase of the recovered clock accordingly.

For example, if the phase of the incoming data stream leads the phase of the recovered clock signal, the phase detector detects this phase difference. The phase detector sends a signal containing the phase difference information to the filter/accumulator which stores this information. If the clock continues to lag the data for a specified amount of time, the filter/accumulator sends a signal 45 to the mixer instructing it to choose the next phase of the recovered clock signal. The phase adjustment mechanism thus realigns the phase of the incoming data and the recovered clock.

Providing a signal instructing the mixer to adjust phase after the phase difference between the data and the recovered clock has remained for a specified time helps ensure that momentary or transient changes in phase will not require a change in the phase of the regenerated clock. A similar action occurs if the phase of the incoming data stream lags the phase of the recovered clock signal. Again, this mechanism realigns the phases of the incoming data and the recovered clock. Realignment helps to ensure that the incoming data signal is sampled at the correct time.

Figure 4:
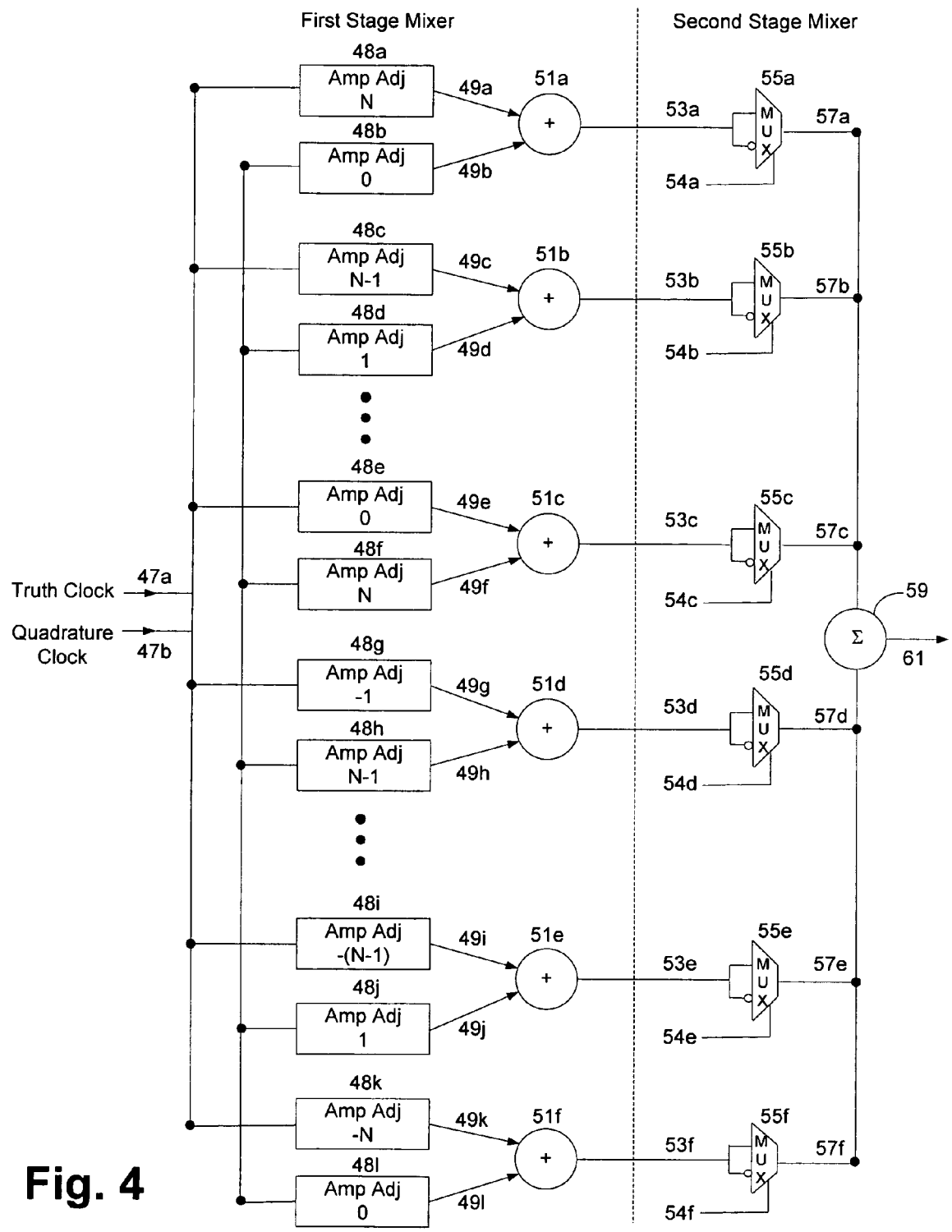
FIG. 4 illustrates a semi-schematic block diagram of an embodiment of a mixer used in the CRU of FIG. 3.

FIG. 4 illustrates an embodiment of a mixer of the CRU of FIG. 3. The illustrated embodiment uses two levels of mixing to create a regenerated clock signal. In the first stage of mixing, master clock signals are mixed to generate a number of intermediate clocks. In the second stage of mixing the intermediate clock signals are mixed to form the regenerated clock.

To generate the intermediate clock signals, master clock signals 47a,b are each provided to a plurality of amplitude adjusters 48a–48l. In one embodiment the amplitude adjusters include an amplifier circuit. In another embodiment, the amplitude adjusters comprise an attenuator. The attenuators operate in parallel. That is, in one embodiment, the clock signals do not pass through multiple, cascaded attenuators. In addition, in one embodiment the attenuators may also invert the truth and quadrature clock signals. Amplitude attenuation can be accomplished through the use of resistors, by biasing transistors to operate in their linear range, or through the use of diodes or voltage regulators or by other methods well known in the art.

In FIG. 4 a negative value in an attenuator, such as in attenuator 48k, indicates that the clock signal is inverted by the attenuator. The inversion is in addition to any amplitude adjustment that may be performed. Inverting elements such as CMOS inverters, inverting operational amplifier based circuits, or other well-known methods may be used to invert the clock signals received by the attenuators.

The outputs 49a–l of the attenuators are provided to N summers or mixers 51a–f. In one embodiment, the summers operate in parallel. That is, each summer has as its inputs various outputs of the attenuators. The summers may be implemented using operational amplifier based circuits, digital signal processing, or by other well known methods.

In one embodiment, each summer receives two signals, one each from two attenuators. The first signal received by the summer is an amplitude adjusted truth clock signal. The second signal received by the summer is an amplitude adjusted quadrature clock signal. The amplitude adjusted signals received by each summer are summed by the respective summers. The output of each of the summers forms an intermediate clock signal.

The N summers produce N intermediate clock signals 53a–f, with each summer producing an intermediate clock signal. The intermediate clocks have the same frequency, but differing phases. Each different phase is generated by summing different amounts of the truth and quadrature clocks. The attenuators allow different amounts of the truth clock and quadrature clock to be provided to the summers. Thus, different amounts of the truth and quadrature clocks are summed. The number of intermediate clocks used is determined by the desired resolution of the CRU.

The summers may be viewed as being arranged in an order, from first to last. Using this construct, a first summer produces an intermediate clock signal with a first phase. Each summer produces an intermediate clock signal with a different phase. The last summer produces an intermediate clock signal with a last phase.

As illustrated, the first summer 51a sums all of the truth clock, and none of the quadrature clock. The second summer 51b sums a large amount of the truth clock and a small amount of the quadrature clock. Subsequent summers in the order receive smaller amounts of the truth clock and larger amounts of the quardature clock. The penultimate summer 51e sums a small amount of the truth clock, and a large amount of the quadrature clock. The final summer 51f sums none of the truth clock and all of the quadrature clock.

As an example, consider the case where N=5. The first summer receives a truth clock signal weighted by 1, and a quadrature clock signal weighted by 0 and sums them. The second summer receives a truth clock signal weighted by 0.75, and a quadrature clock signal weighted by 0.25 and sums them. The third summer receives a truth clock signal weighted by 0.5, and a quadrature clock signal weighted by 0.5 and sums them. The fourth summer receives a truth clock signal weighted by 0.25, and a quadrature clock signal weighted by 0.75 and sums them. The final summer receives a truth clock signal weighted by 0, and a quadrature clock signal weighted by 1 and sums them.

There are 5 outputs, one from each of the summers, each output forming an intermediate clock signal. The amount of truth and quadrature clock signals that are used varies for each intermediate clock signal generated. Since the truth and quadrature clock signals have different phases, each intermediate clock signal has a unique phase.

In the embodiment described in the above example, the sum of the amount of truth clock signal used and the amount of quadrature clock signal used is equal to one. Additionally, in the example above, the difference in the amount of a particular clock signal summed from one summer to the next was a constant. In other embodiments the difference in the amount of a particular clock signal summed from one summer to the next is not a constant.

For a 90 degree phase offset between the truth clock and the quadrature clock, different equations describe the generation of each 90 degrees of the intermediate clock signals.

An equation describing the generation of an arbitrary intermediate clock phase, a, greater than 0° and less than or equal to 90° is $$P_a = (N-a) * P_{truth} + (a) * P_{quad}$$

Where $P_{truth}$ is the truth clock signal, and $P_{quad}$ is the quadrature clock signal. Also, a is an integer in the range from 0 to N, inclusive. The attenuators allow a to be varied, as described above.

The attenuation of each clock signal that is input to the summer is determined by the variable a. As a varies from 0 to N, the amount of truth clock signal that is summed varies from 100% at a equals zero to 0% at a equals N. Thus, fractional amounts of the truth clock signal and the quadrature clock signal are summed to generate an intermediate clock signal.

Discussing the embodiment of FIG. 4 with respect to the above, the first mixer stage provides outputs for each value of N. In the preferred embodiment, the truth clock signal and the quadrature clock signal have 90 degrees of phase offset. Consequently, the phases of the intermediate clock signals corresponding to a equals 0 to N are evenly distributed in the range of the clock cycle from greater than 0° and less than or equal to 90°. For intermediate clock phases other than in the range from greater than 0° and less than or equal to 90°, different equations describe the generation of the intermediate clock signals.

To generate intermediate clock signals greater than 90° to less than or equal to 180° the same mixing mechanism is used, with the input sources being the quadrature clock signal and the complement of the truth clock signal; an equation describing this relationship is $$P_a = (N+a) * \overline{P_{truth}} + (a) * P_{quad}$$

In this case a is an integer in the range from 0 to −N, inclusive. A negative value indicates the complement of that particular input. The attenuators allow a to be varied, as described above.

The attenuation of each clock signal that is input to the summer is determined by the variable a. As a varies from 0 to −N, the amount of the complement of the truth clock signal that is summed varies from 100% at a equals zero to 0% at a equals −N. Thus, fractional amounts of the truth clock signal and the quadrature clock signal are summed.

The first mixer stage provides outputs for each value of N. These outputs are the intermediate clock signals that can be seen in FIG. 4. In one embodiment, the truth clock signal and the quadrature clock signal have 90 degrees of phase offset. Consequently, the phases of the intermediate clock signals corresponding to a equals 0 to −N are evenly distributed in the range from greater than 90° to less than or equal to 180° of the clock cycle.

Thus, the first stage of the mixer generates intermediate clock phases between 0 and 180 degrees, as described above. Since the clock signals are odd functions in the range from 0° to 360°, the intermediate clock phases greater than 180° degrees and less than or equal to 360° are the complement of the clock phases between 0° and 180°. Thus, intermediate clock signals with phases greater than 180° and less than or equal to 270° are generated according to $$P_a = \overline{(N-a) * \overline{P_{truth}} + (a) * P_{quad}}$$

Similarly, intermediate clock signals with phases greater than 270° and less than or equal to 360° are generated according to $$P_a = \overline{(N+a) * \overline{P_{truth}} + (a) * P_{quad}}$$

Returning to FIG. 4, in the second stage of the mixer, the intermediate clock signals are themselves mixed in order to generate the recovered clock. Multiplexors 55a–f in the second stage of the mixer receive both true and complementary versions of the intermediate clock signals generated by the previous stage of the mixer. There are 4N multiplexors, corresponding to the 4N intermediate clock signals. In one embodiment, each multiplexor is a two input multiplexor. The multiplexor receives at its inputs a particular intermediate clock signal and the complement of that signal. A select signal 54a–f for each multiplexor is generated by the filter/accumulator. The select signal causes the multiplexor to output either the true or complementary version of the intermediate clock signal. By varying the select signals that the multiplexors receive, the filter/accumulator alters which intermediate clock signals are received by the summer 57 in the second stage of the mixer.

The output signals from the multiplexors 59a–f are provided to the summer. The summer sums the 4N signals received from the multiplexors to form the regenerated clock signal 61. Altering the intermediate clocks summed in the second stage of mixing varies the phase of the recovered clock. Thus, by varying the select signals that the multiplexors receive, the filter/accumulator can change the phase of the regenerated clock. The regenerated clock signal can then be used to recover the incoming serial data.

The present invention therefore provides a scalable clock recovery system able to be implemented on a single chip. Although the invention is described in certain specific embodiments, it should be recognized that the invention may be practiced other than as specifically described. Thus, the invention should be considered to be the claims and their equivalents supported by this disclosure.

What is claimed is:

1. A clock recovery system comprising:
   a clock master unit (CMU), generating a plurality of clock signals, the clock signals each approximate the same frequency and having differing phases;
   a plurality of clock recovery units (CRUs) receiving the clock signals generated by the CMU and receiving at least one of a plurality of data signals;
   a first mixer stage in each CRU receiving the clock signals generated by the CMU and mixing the clock signals generated by the CMU to form additional clock signals approximate the same frequency and having differing phases; and a second mixer stage in each CRU receiving the additional clock signals and forming a recovered clock signal using at least some of the additional clock signals and a selection signal.

2. The clock recovery system of claim 1 wherein each CRU further comprises a phase detector which compares the recovered clock signal with at least one of the data signals.

3. The clock recovery system of claim 2 wherein the additional clock signals have finer phase differences than the clock signals generated by the CMU.

4. The clock recovery system of claim 3 wherein the phase detector generates at least one signal used in forming the selection signal.

5. The clock recovery system of claim 4 wherein the second mixer stage sums either complementary or non-complementary versions of the additional clock signals to produce the recovered clock signal.

6. The clock recovery system of claim 5 wherein each CRU further comprises a low pass filter receiving the at least one signal generated by the phase detector, the low pass filter generating the selection signal.

7. A single chip clock recovery system comprising:
a single clock-generating unit, generating a plurality of clock signals;
a clock distribution network receiving the clock signals; and
a plurality of clock recovery units (CRUs) each receiving the clock signals from the clock distribution network and one of a plurality of data signals, each of the CRUs including:
a phase detector comparing the one of the data signals and a recovered clock signal formed by the CRU, the phase detector generating a phase difference signal;
a weighted mixer generating a plurality of further clock signals using the plurality of clock signals; and
a combiner selectively combining at least some of the plurality of further clock signals to form the recovered clock signal, the combiner using a selector signal based on the phase difference to selectively combine the further clock signals.

8. The single chip clock recovery system of claim 7 wherein the clock signals generated by the CMU have a substantially fixed phase difference.

9. The single chip data recovery system of claim 8 wherein each CRU includes a filter/accumulator receiving the phase difference signal.

10. A clock generation system comprising:
means for generating multiple out-of-phase clock signals, the clock signals being approximate a predetermined frequency;
means for producing a recovered clock signal, using at least two of the clock signals generated by the means for generating multiple out-of-phase clock signals, the recovered clock signal having a selectively variable phase and a frequency approximate the frequency of the multiple out of phase clock signals; and
further comprising means for maintaining a specified phase of the recovered clock signal with respect to a received data signal.

11. A clock generation system comprising:
means for generating multiple out-of-phase clock signals, the clock signals being approximate a predetermined frequency;
means for producing a recovered clock signal, using at least two of the clock signals generated by the means for generating multiple out-of-phase clock signals, the recovered clock signal having a selectively variable phase and a frequency approximate the frequency of the multiple out of phase clock signals; and
wherein the means for producing a recovered clock signal includes means for mixing the at least two clock signals in varying amounts to form a plurality of intermediate clock signals with differing phases.

12. The clock generation system of claim 11 wherein the means for mixing the at least two clock signals includes multiple levels of mixing, each level of mixing generating a plurality of intermediate clock signals.

13. The clock generation system of claim 12 wherein the means for producing a recovered clock signal includes means for selecting at least one of the intermediate clock signals and means for generating a recovered clock signal using the selected intermediate clock signals.

* * * * *